United States Patent [19]

Smart

[11] Patent Number: 4,473,239
[45] Date of Patent: Sep. 25, 1984

[54] STABILIZER PAD ASSEMBLY

[76] Inventor: Robert L. Smart, 11760 Fields Rd., New Carlisle, Ohio 45344

[21] Appl. No.: 384,593

[22] Filed: Jun. 3, 1982

[51] Int. Cl.³ .............................................. B60S 9/02
[52] U.S. Cl. ................................ 280/763.1; 212/189; 248/188.8; 248/677; 403/319; 403/331
[58] Field of Search ................ 212/189; 248/633, 677, 248/188.8, 188.9, 357; 280/763.1, 764.1; 403/319, 331

[56] References Cited

U.S. PATENT DOCUMENTS

| | | | |
|---|---|---|---|
| 3,239,185 | 3/1966 | Sweeney et al. | 248/633 X |
| 3,425,428 | 2/1969 | Schwartz | 403/331 X |
| 3,721,458 | 3/1973 | Mitchell | 280/764.1 |
| 3,897,079 | 7/1975 | MacKenzie et al. | 280/764.1 |
| 3,913,942 | 10/1975 | MacKenzie et al. | 212/189 X |
| 3,930,668 | 1/1976 | Schuermann et al. | 280/763.1 |
| 3,976,306 | 8/1976 | Nault | 280/763.1 |
| 4,023,828 | 5/1977 | MacKenzie et al. | 280/763.1 |
| 4,039,206 | 8/1977 | Nault | 212/189 X |
| 4,114,845 | 9/1978 | Weisenberger | 248/677 X |

Primary Examiner—Joseph F. Peters, Jr.
Assistant Examiner—Michael Mar
Attorney, Agent, or Firm—Jerome P. Bloom

[57] ABSTRACT

Apparatus providing an improved stabilizer pad assembly or foot construction for outriggers or stabilizer arms provides a housing containing a stabilizer pad in a manner to provide for a three dimensional relative movement therebetween under shifting load conditions. The housing of such apparatus is shell-like in character and has openings in its side and bottom, the side opening accommodating a slip fit therein of a stabilizer pad and its containment without any positive interconnection thereof to the housing. The containment of the pad is achieved by the application of a readily releasable rod to and across the side opening to the interior of the housing. The opening in the bottom of the housing provides for the dependency therethrough of an anchoring element forming part of the pad, which may be reversible in character. The invention also provides an improved pad featuring a base plate and an H-shaped metal cleat projected from one face thereof and located in spaced relation to the bounding edges of the plate, on all sides.

21 Claims, 6 Drawing Figures

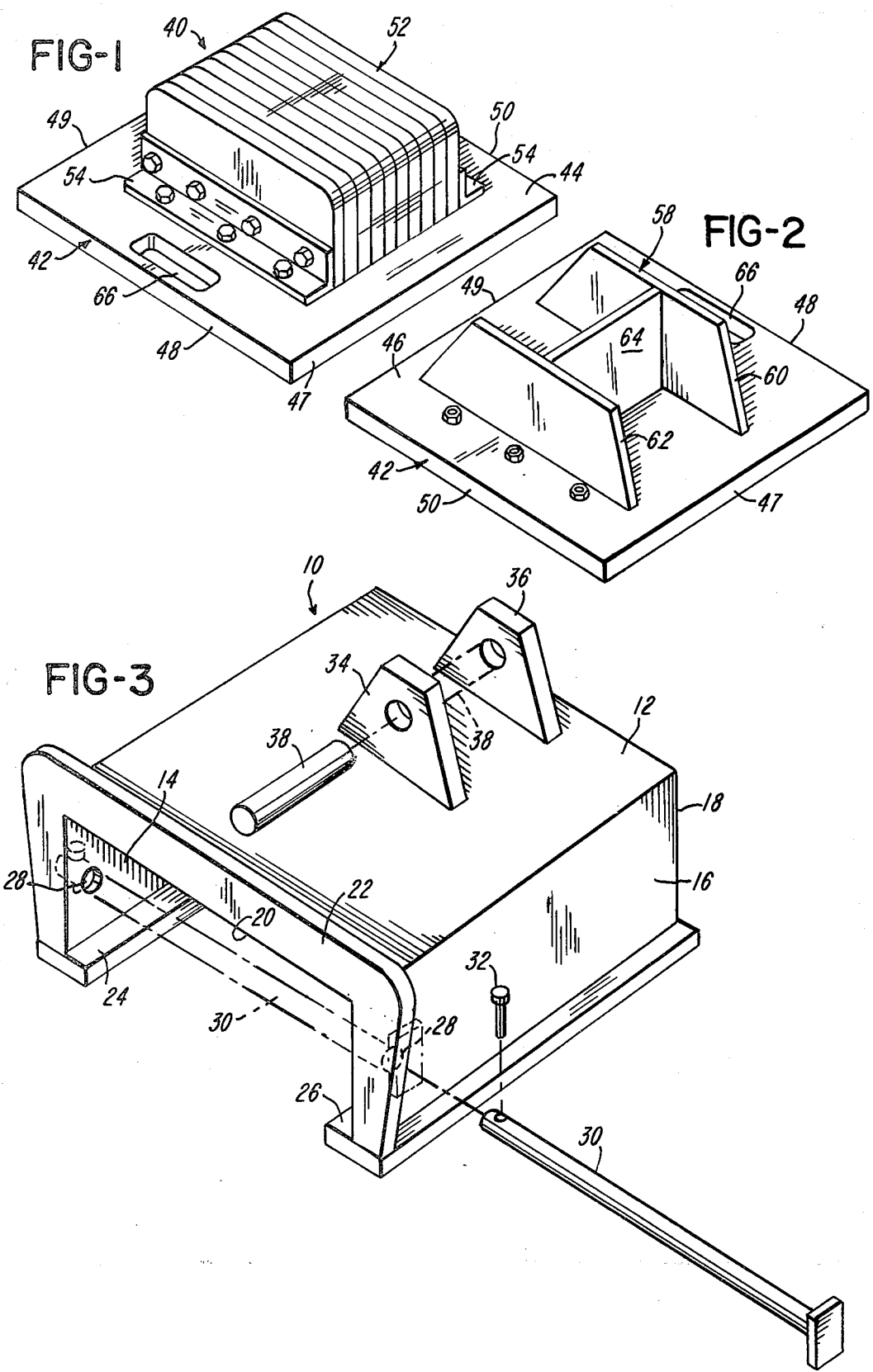

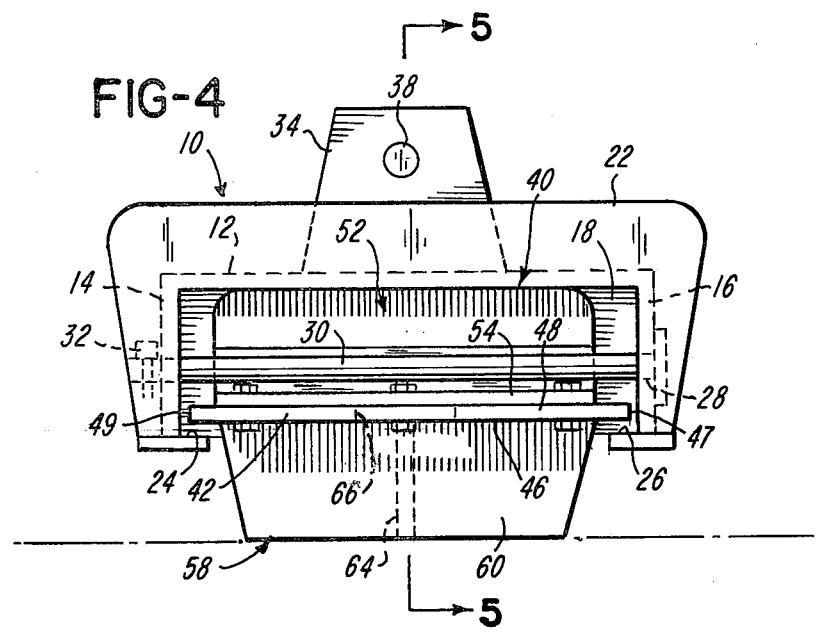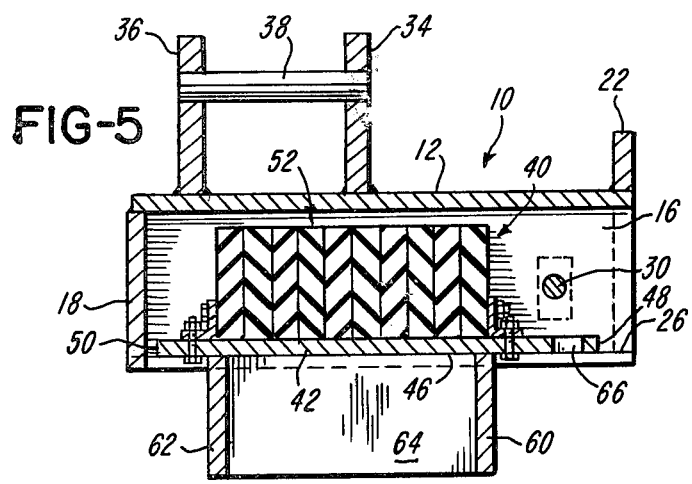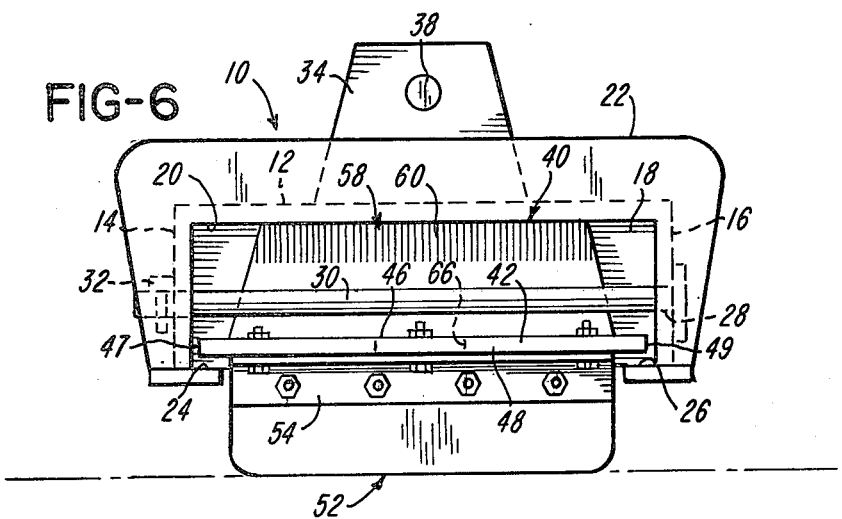

STABILIZER PAD ASSEMBLY

BACKGROUND OF THE INVENTION

This invention relates to improvements in the construction of outriggers and stabilizer arms applied to equipment the nature, location and/or operation of which makes it subject to instability, unbalance or slippage in the use thereof. More particularly, the invention provides an improved stabilizer pad assembly or foot construction for outriggers and stabilizer arms which renders such apparatus and its components economical to fabricate, more efficient and satisfactory in use and unlikely to malfunction. Invention embodiments lend assured stability to and safety in use of the equipment to which they apply.

That slippage and instability has been found to exist in the use of prior art apparatus having pertinence to the subject invention cannot be denied. One source of such problems has been the inability of the stabilizer pads or feet of the outriggers or stabilizer arms to flexibly or readily adapt to the shifting loads imposed thereon in the operation of the equipment to which they apply. The degree of such problems is compounded when the prior art apparatus is used on an uneven ground surface, a slope or a hillside. Such problems occur in the operation of a great variety of equipment used in agriculture, road building and construction, such as a backhoe, for example. Thus the need for the present invention.

Illustrations of the state of the prior art may be found in the following patents:
U.S. Pat. No. 3,721,458 Mitchell
U.S. Pat. No. 3,897,079 MacKenzie et al.
U.S. Pat. No. 3,913,942 MacKenzie et al.
U.S. Pat. No. 3,930,668 Schuermann et al.
U.S. Pat. No. 3,976,306 Nault
U.S. Pat. No. 4,023,828 MacKenzie et al.
U.S. Pat. No. 4,039,206 Nault However, the inventor knows of no prior art which is specifically pertinent to the features constituting the novelty of his invention.

SUMMARY OF THE INVENTION

Invention embodiments feature a reversible pad and a housing therefor within which the pad is so contained as to accommodate a shifting and somewhat floating movement of one relative to the other, even under load. This is in addition to providing means for a pivoting mount of this assembly to the stabilizer arm or outrigger of which it forms a part.

The invention also provides an improved pad including a base plate sized and configured as a square, all sides being substantially equal. Projected from one face of this base plate and spaced substantially from the peripheral edge thereof, on all sides, is an H-shaped cleat. This cleat is comprised of three edge mounted perpendicularly projected plates, two of which form the sides of the H and the third of which forms the bridging portion thereof, all plates being equal as to the depth of their projection.

Another feature of the invention is a housing for use with an outrigger, stabilizer arm or the like formed for a simple slip fit coupling thereto of a stabilizer pad free of any connection therewith and free to move within the limits of the housing interior yet contained to prevent its complete displacement from the housing.

A primary object of the invention is to provide a degree of flexibility in an outrigger or stabilizer arm which facilitates effective ground gripping and maximum stability and safety in use thereof.

Another object is to provide an assembly affording a pivotally mounting foot for an outrigger or stabilizer arm which is simple and economical to fabricate, more efficient and satisfactory in use and unlikely to malfunction.

A further object is to provide a stabilizer pad assembly comprising a housing having a cavity wherein an anchoring pad is slip fit which projects therefrom a cleat characterized by the pad and housing being interrelated to accommodate a relative movement therebetween under load, to insure against slippage and provide stability and safety in use of the equipment to which said assembly is applied.

Another object is to provide an improved pad for use in connection with an outrigger or stabilizer arm which facilitates a secure, stable and safe anchoring of the equipment during conditions of shifting load.

An additional object is to provide an assembly affording an improved construction for the foot of an outrigger or stabilizer arm wherein the pad is simply housed for a slip fit application thereto or removal therefrom by way of an opening in the side of the housing.

A further object is to provide an assembly of a housing and an anchoring pad and/or component parts of such an assembly for use in connection with an outrigger or stabilizer arm possessing the advantageous structural features, the inherent meritorious characteristics and means and mode of use herein described.

Referring to the drawings wherein one but not necessarily the only form of embodiment of the invention is illustrated, FIG. 1 is a perspective view of a reversible stabilizer pad per the present invention;

FIG. 2 is a perspective view of the pad shown in FIG. 1 in a reversed condition;

FIG. 3 is a perspective view of the pad housing per the present invention;

FIG. 4 is an end view of the housing and the pad illustrating the H-shaped cleat portion of the pad in its operative position, under load;

FIG. 5 is a sectional view taken on line 5—5 of FIG. 4, exhibiting the positions of the pad and its housing under a no load condition; and FIG. 6 is an end view corresponding to that of FIG. 4 illustrating the pad in a reversed position.

Like parts are indicated by similar characters of reference throughout the several views.

The invention embodiment illustrated comprises a generally rectangular shell-like housing 10. This housing will be further described with reference to its normal orientation in use.

The housing 10 includes a rectangular top 12 perpendicular to and dependent from which are side walls 14 and 16 and one end wall 18. The walls 14, 16 and 18 are equal in depth; the walls 14 and 16 run the length of the top 12 and are formed integral with its side edges; and the wall 18 runs the width of the top, at one end thereof in bridging integrally connected relation to the adjacent ends of the side walls 14 and 16.

Welded to be integral with, perpendicular to and coextensive in length with the side wall 14, at its lower edge, is a longitudinally extending flat bar 24 which is rectangular in cross section and projects inwardly of the side wall 14 in a plane parallel to that occupied by the top 12. A bar 26 identical to the bar 24 is similarly applied the length of the side wall 16 to project toward and co-planar with the bar 24. As will be seen the bars 24 and 26 serve to provide internal flanges on the lower edges of the side walls 14, 16 and slides which facilitate the application of a stabilizer pad 40 to the housing 10. The adjacent inner edges of the bars 24 and 26, together with the end wall 18, frame a rectangular opening in the bottom of the housing 10 which runs the length thereof.

Welded to the outer surface of the housing, about its end 20 which is open, is an inverted U-shaped frame 22 which reinforces and rigidifies the housing structure.

Each of the side walls 14 and 16 include an indentically positioned aperture 28 adjacent and spaced from the end 20 of the housing 10. The apertures 28 are transversely aligned on a level substantially midway of the depth of the side walls 14 and 16. Once a stabilizer pad is applied to the housing, the apertures 28 receive therethrough a rod 30 having an expanded head at one end which abuts one side wall of the housing and an aperture in its opposite end which projects outwardly of the housing. The aperture in the rod 30 receives therethrough a retention pin. As should be obvious the rod 30 has no connection to the stabilizer pad and its only function is that of a blocking device which insures the retention of the stabilizer pad in the housing 10 until the removal of the retention pin 32 and the subsequent removal of the rod from the housing.

Two brackets 34, 36 are welded to rise perpendicular to and from the top of the housing 10, in a longitudinally spaced relation and in location centered between its sides. The brackets 34 and 36 have apertures which are aligned to accommodate a bridging pivot rod 38 serving as means for a pivotal connection of the housing (in a conventional manner) to form the foot of an outrigger or stabilizer arm.

In the preferred embodiment illustrated, the stabilizer pad 40 is reversible. It comprises a square base plate 42, the bounding edges 47, 48, 49 and 50 of which are substantially equal in length. Fixed to project from and perpendicular to one face 44 of the plate 42, at a location within and spaced from its peripheral edges, on all sides, is a rectangular block 52 of laminated reinforced rubber. The block 52 is relatively rigid but somewhat resilient in character. Its respective ends are abutted, adjacent their base, by shallow plate elements 54, between and to which they are secured and anchored by through bolts. The plate elements 54 embody means by which they are suitably secured to project from and perpendicular to face 44. The plate elements 54 are parallel and postion the block 52 between and more closely adjacent the edge 50 than the edge 48 and they are spaced equidistantly from the edges 47 and 49 of the plate 42.

The block 52 provides the stabilizer pad with a resilient anchor adapted for frictional engagement with a surface such as that of a street, highway or the like, useful in the event the apparatus of which it forms a part must function in such an environment.

An H-shaped cleat 58 is welded to and projected outwardly from and perpendicular to the reverse face 46 of the plate 42. Cleat 58 is located within the boundaries of the face 46 and spaced from the edges thereof on all sides. It includes two metal plates 60 and 62 identical in size and trapezoidal outline edge mounted to project outwardly from and perpendicular to the face 46 and bridged by a third metal plate 64. The plate 64 has a rectangular outline, is edge mounted to project perpendicular to the face 46 and integrated with the plates 60 and 62 by welding to provide the "H" shape of the cleat.

The plates 60 and 62 of the cleat 58 run parallel to the sides 48 and 50 of the plate 42 and like the block 52 are somewhat closer to the edge 50 than the edge 48. Also, the ends of the plates 60 and 62 at the respective opposite extremities thereof are spaced equidistant from the edges 47 and 49. With the arrangement thus provided the H-shaped cleat 58 is in substantially back to back relation with respect to the resilient block 52.

It should be noted that the depth of projection of each of the plates 60, 62 and 64 is equal.

A slot 66 is formed in the plate 42 adjacent and running parallel to the edge 48 and spaced equidistantly from the edges 47 and 49. The slot 66 has a length and width to freely accommodate the fingers of a hand, thereby to provide a hand grip facilitating the manipulation of the stabilizer pad 40 in its application to and removal from the housing 10.

With the rod 30 removed, one can then apply the pad 40 to the housing 10. Since both the block 52 and the cleat 58 lie within and are adequately spaced from the boundary thereof, plate 42 can be manipulated to establish outer surface portions of its face 46, including edges 47 and 49, in bearing relation to the innermost surface portions of the bars 24 and 26. Once pad 40 is positioned so limited portions of the lateral boundaries of the face 46 are brought to bear on the bars 24 and 26, it is a simple matter to slide the plate 42 inwardly of the housing 10 and towards the back wall 18 until the block 52 is beyond and clear of the line of the apertures 28. At this point rod 30 can be applied through the apertures 28 to produce a barrier to block removal of the pad from the housing. Of course, once the rod is applied, the retention pin 32 is also applied to prevent the withdrawal of the rod from the housing. In the application of the stabilizer pad as above described the slot 66 is outermost, at the open end of the housing, and the cleat 58 depends between and in respectively spaced relation to the bars 24 and 26 and projects between these bars outwardly of the bottom of the housing. The depth of the projection of the cleat 58 is greater than the depth of the housing to insure a substantial projection thereof under load, under which condition the block 52 will abut and bear, coextensive therewith, on the inner surface of the top 12 of the housing 10.

Attention is directed to the fact that in the assembled relation of the pad 40 there is clearance of a limited degree between the edges 47 and 49 and the side walls 14 and 16. There is, moreover, on full insertion of the pad to the limit of the end wall 18, a substantial spacing between the rod 30 and the adjacent end of the resilient block 52. The same condition would exist as between the cleat 58 and the rod 30 under similar circumstances. Furthermore, the depth of the housing as compared to the depth of the plate 42 plus the depth of the block 52 or the cleat 58 is greater, giving space for vertical movement as between the pad and the housing under shifting load conditions which might apply during use of the apparatus in application to an outrigger or stabilizer arm in connection with operating equipment.

Using the stabilizer pad assembly of the construction and nature described, it has been established in tests that under conditions of terrain or underlying surface being uneven, sloped or significantly inclined that the invention apparatus inhibits slippage of the structure involved and provides a most stable operating condition for the equipment to which the outrigger or stabilizer arms of which it forms a part are applied.

Furthermore, each of the housing 10 and a pad comprised of the plate 42 bearing an H-shaped cleat indicate independent benefits in use thereof. To apply any given pad to a housing such as the housing 10 obviously simplifies its application and obviates the need for any positive connection directly to the pad to insure its proper function. Given the degree of play contemplated as between a pad and the housing 10 permitting relative freedom of movement therebetween, though limited, provides a flexibility of application of the pad and more effective performance thereof for the purpose intended than heretofore possible for apparatus of this type. The use of the H-shaped cleat has been found to lend a degree of security and balance in use of a pad by virtue of its position being limited to lie within the boundaries of the plate 42 and being substantially spaced therefrom. The projection of the surface 46 relative the boundaries of the cleat 58 appears to lend a versatility of base footing as provided by this apparatus giving much better performance than prior art cleated pads heretofore available.

In summary, the assembly of the invention lends benefits in its use which are singularly important in that the housing and the stabilizer pad contained and protected thereby are so constructed and interrelated as to enable their relative movement in multiple directions, including directions substantially at right angles to one another and even in a three dimensional sense under both load and no load conditions. This permits optimal shifting and accommodation of load under adverse circumstances. It also facilitates protection of the pad and cleaning of the assembly. In this last respect, it should be self evident that the assembly may be induced to vibrate, under no load conditions, by shaking thereof through the medium of movement of the outrigger or stabilizer arm to which it connects, thereby to dislodge debris from the pad and the cavity of the housing which protects and lends support to the pad.

It is accordingly seen that the construction of the invention assembly and its components, whether taken together or separately, enables a very important advance in the art which in use thereof will be reflected by a definitely improved performance of equipment requiring the use of outriggers or stabilizer arms as well as greater safety, security and flexibility in use thereof.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and constuction herein disclosed comprise but one of several modes of putting the invention into effect and the invention is therefore claimed in any of its forms or modifications within the legitimate and valid scope of the appended claims.

The embodiments of the invention in which an exclusive property or privilege is claimed are defined as follows:

1. A ground engaging stabilizer pad assembly or foot of an outrigger comprising a housing and a stabilizer pad, said housing having in connection therewith means defining a support, said pad including a portion thereof contained within said housing a part of which normally mounts in bearing relation to said support when said pad and said housing are spaced from a ground surface under no load conditions, the relative configuration of said housing and said pad which is contained therein providing said pad with a relative freedom of movement within and relative to said housing in multiple directions when said pad is subjected to load and said pad further including means defining a second portion thereof arranged to project from said housing to serve as anchoring means as it is applied to a ground surface under load.

2. An assembly as in claim 1 wherein said housing has a shell-like configuration and includes an opening in what constitutes its bottom in use thereof, through which opening said second portion of said pad projects in a spaced relation to said bearing means which bound said opening and prevent the movement therethrough of the first said portion of said pad.

3. A stabilizer pad assembly or foot of an outrigger comprising a housing and a stabilizer pad, said pad including a first portion so mounted and contained within said housing as to provide for relative movement between said pad and said housing in multiple directions, including directions substantially at right angles to one another, and a second portion projecting from said housing to serve as an anchoring means, said housing having a shell-like configuration including an opening in its bottom through which said second portion of said pad projects in a spaced relation to means in connection with said housing which bounds said opening, a second opening in the shell-like configuration of said housing for the introduction of said first portion of said pad in and the removal thereof from said housing and means independent of said pad for selectively blocking said second opening to contain said pad within said housing.

4. A stabilizer pad assembly or foot of an outrigger comprising a housing and a stabilizer pad, said pad including a first portion so mounted and contained within said housing as to provide for relative movement between said pad and said housing in multiple directions, including directions substantially at right angles to one another, and a second portion projecting from said housing to serve as anchoring means, said housing having a shell-like construction including a top, dependent sides, an opening in its bottom and a second opening in one side thereof, means bounding said opening in the bottom of said housing providing slide surfaces extending to said second opening to provide support for said first portion of said pad and means for a slip fit application of said first portion of said pad to and a sliding removal thereof from said housing.

5. An assembly as in claim 4 characterized by means releasably applied to said housing adapted to extend across said second opening and provide a block to removal of said pad from said housing, said pad, as assembled to said housing, being free of any direct connection with said housing and free of restraint other than by reason of the limits of said blocking means and the bounding portion of the housing within which it is contained.

6. An assembly as in claim 4 wherein said pad includes a plate and said anchoring means is positioned to project from one face of said plate at a location within and substantially spaced from the peripheral boundary thereof.

7. An assembly as in claim 6 wherein outer peripheral surface portions of said one face of said plate from which said anchoring means projects bear on said slide surfaces under no load conditions.

8. An assembly as in claim 6 wherein said anchoring means is an H-shaped cleat.

9. An assembly as in claim 8 wherein the sides of said H-shaped cleat are oriented to be substantially parallel to said second opening when said pad is assembled to said housing.

10. An assembly as in claim 9 wherein said plate includes an opening therein providing a hand hold at one edge thereof.

11. An assembly as in claim 8 wherein the reverse face of said plate mounts a resilient anchor means in back to back relation to said cleat.

12. A stabilizer pad assembly or foot of an outrigger comprising a housing and a stabilizer pad, said pad including a first portion so mounted and contained within said housing as to provide for a relative movement between said pad and said housing in multiple directions, and a second portion projecting from said housing to serve as first anchoring means, said housing having a cavity within which said first portion of said pad is contained free of connection to said housing, said first portion of said pad comprising a plate having second anchoring means projecting therefrom in substantially back to back relation to said first anchoring means, and said housing and said pad being constructed and arranged to accommodate a three dimensional relative movement therebetween.

13. Apparatus for use in combination with a stabilizer pad to form therewith a stabilizer pad assembly or a foot for an outrigger or stabilizer arm comprising a shell-like structure defining a housing including a top, sides dependent from said top, a bottom, an opening in said bottom and a second opening in one side thereof and means in connection with opposite sides of said structure providing guides extending to said second opening to provide support for a stabilizer pad to be inserted in said housing by way of said second opening to have portions thereof bear on said guides, said opening in the bottom of said housing accommodating the projection therethrough of such anchoring means as are provided in connection with the pad in the course of its insertion thereof in said housing.

14. Apparatus as in claim 13 wherein said guides are parallel bars providing for a sliding mount of a stabilizer pad.

15. Apparatus as in claim 13 including a device releasably connected to said housing to extend crosswise thereof adjacent said second opening to block removal of a pad from said housing once the pad is inserted in said housing.

16. A ground engaging stabilizer pad for use in forming a foot of an outrigger or stabilizing arm comprising a plate, an H-shaped cleat including trapezoidal side portions mounted to and projected from one face of said plate at a location positioned within and spaced from the boundaries thereof, outer portions of said one face of said plate and said cleat being adapted to provide complementary base surface portions of said pad in the application thereof to an outrigger or stabilizer arm.

17. A foot for an outrigger or stabilizer arm comprising a housing containing a portion of a stabilizer pad including anchoring means in connection therewith, said housing being adapted for connection to an outrigger arm and being open at its bottom for the dependency therethrough of anchoring means in connection with said pad, means bounding said opening in said housing for supporting said portion of said pad contained within said housing, and said housing and the portion of said pad contained within said housing having a relative configuration accommodating a movement of said portion of said pad relative said housing in at least three different directions thereby, in use thereof in connection with an outrigger arm, to enable a multidimensional adjustment thereof affording stability to the arm, irrespective of the underlying ground contour.

18. Apparatus as in claim 17 wherein said housing and said portion of said pad contained therein have a relative configuration accommodating a three dimensional movement of said portion of said pad with respect to said housing.

19. Apparatus as in claim 18 wherein said housing has a side opening by means of which said pad may be applied to or removed from said housing and means are releasably applied to said housing across said opening to contain said pad within and in a generally coupled relation to said housing with said anchoring means adapted and arranged to project from its bottom.

20. Apparatus as in claim 18 wherein said housing is a shell-like structure the opening at the bottom of which is bounded, at opposite sides, by means defining, at least in part, internal flanges over which portions of the periphery of the one face of said pad which constitutes its lower face in use position in the application of said pad to said housing.

21. Apparatus as in claim 17 wherein said pad includes a base plate each of the opposite faces of which has anchoring means in connection therewith and projected therefrom, the anchoring means projected from one face of said plate comprising relatively rigid but somewhat resilient means and that projected from the opposite face of said plate being a substantially H-shaped cleat which is perpendicular thereto.

* * * * *

UNITED STATES PATENT AND TRADEMARK OFFICE
CERTIFICATE OF CORRECTION

PATENT NO. : 4,473,239
DATED : September 25, 1984
INVENTOR(S) : Robert L. Smart

It is certified that error appears in the above-identified patent and that said Letters Patent is hereby corrected as shown below:

Col. 3, line 22, a comma is inserted following "obvious";

line 50, "postion" is corrected to read --position--.

Col. 5, line 61, "constuction" is corrected to read --construction--.

Signed and Sealed this

Twenty-sixth Day of February 1985

[SEAL]

Attest:

DONALD J. QUIGG

Attesting Officer

Acting Commissioner of Patents and Trademarks